W. M. FULTON.
TRAP.
APPLICATION FILED SEPT. 11, 1916.

1,337,064.

Patented Apr. 13, 1920.

Inventor
Weston M. Fulton.
By Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

TRAP.

1,337,064.      Specification of Letters Patent.    Patented Apr. 13, 1920.

Application filed September 11, 1916. Serial No. 119,471.

*To all whom it may concern:*

Be it known that I, WESTON M. FULTON, a citizen of the United States of America, and a resident of Knoxville, Tennessee, have invented a new and useful Improvement in Traps, which invention is fully set forth in the following specification.

This invention relates to traps of the type wherein a vessel is mounted to be moved to discharge the accumulated fluid, as by the weight of such fluid, and while shown as applied to traps for handling water of condensation, is of equal utility wherever a trap of this type is employed.

Heretofore it has been customary to mount the movable vessel upon hollow trunnions constituting ducts communicating with the interior of the vessel for the inlet and outlet of fluids. Such structures have presented the grave disadvantage, especially when used in high pressure steam systems, that the packing for these trunnions, to prevent leakage, has presented such frictional resistance to movement of the vessel as to seriously interfere with the tilting of the trap, and therefore with its sensitiveness to variations in the weight of fluid therein. Furthermore, expansion of these ducts, owing to the heat of the fluid passing therethrough, has caused them to bind in their bearings so as at times to render the vessel non-responsive to the weight of accumulated fluid.

It is an object of this invention to provide an improved trap comprising a vessel mounted for movement about a transverse axis wherein the fluids are led into and out of the vessel by conduits independent of the pivotal mounting of the vessel. Thereby is avoided the frictional resistance to the movement of the vessel heretofore necessarily attendant on the employment of packed hollow trunnions.

A further object of this invention is to provide a trap, of the type which comprises a vessel mounted for movement, with a conduit or conduits for the inlet and outlet of fluids which are separate from the pivotal mounting of the vessel and so positioned or constructed that the fluid-pressure within the vessel and conduit or conduits does not adversely affect movement of said vessel.

Stated briefly, the invention comprises a trap mounted for movement, as by the weight of accumulated fluid therein, and having a conduit or conduits communicating therewith, said conduit or conduits comprising a movable section or sections preferably of flexible wall, to permit the aforesaid movement of the trap and being so constructed or arranged that the pressure on said flexible wall does not adversely affect the movement of said trap. Such movement of the trap is preferably provided for by transverse pivots, and the aforesaid flexible wall is preferably constructed of flexible expansible and collapsible corrugated-metal. In the form shown, the trap is mounted on transverse pivots the axis of which at all times intersects the axis of said conduit or conduits, whereby the pressure within said conduit or conduits and the vessel constituting the main part of said trap is balanced with respect to said axis.

The invention is capable of receiving a variety of mechanical expressions, one of which for purposes of illustration has been shown on the accompanying drawing; but it is to be expressly understood that this embodiment has been selected for purposes of illustration only, and is not to be construed as a definition of the limits of the invention, reference being had to the appended claims for that purpose.

Referring to the drawing, wherein the same reference characters designate corresponding parts in the several figures, Figure 1 is an elevation of a trap embodying the present invention;

Figure 1:
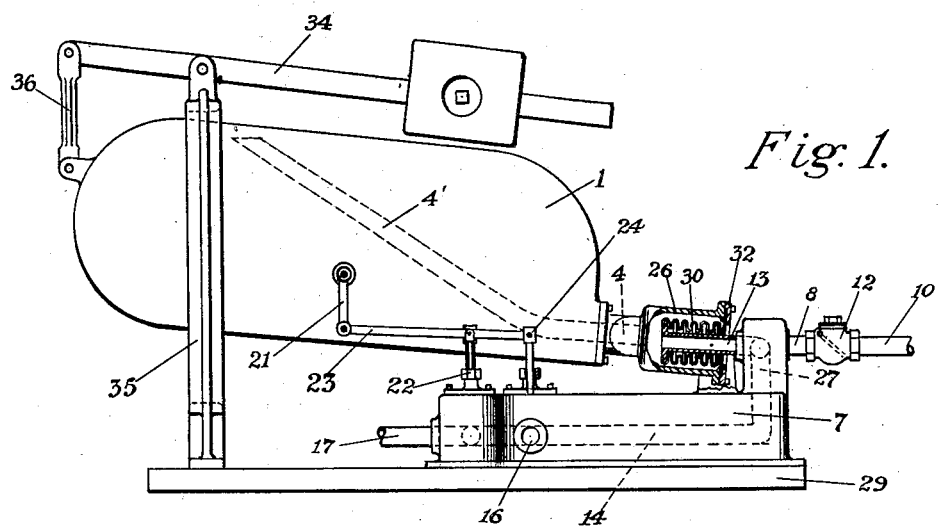
Figure 2:
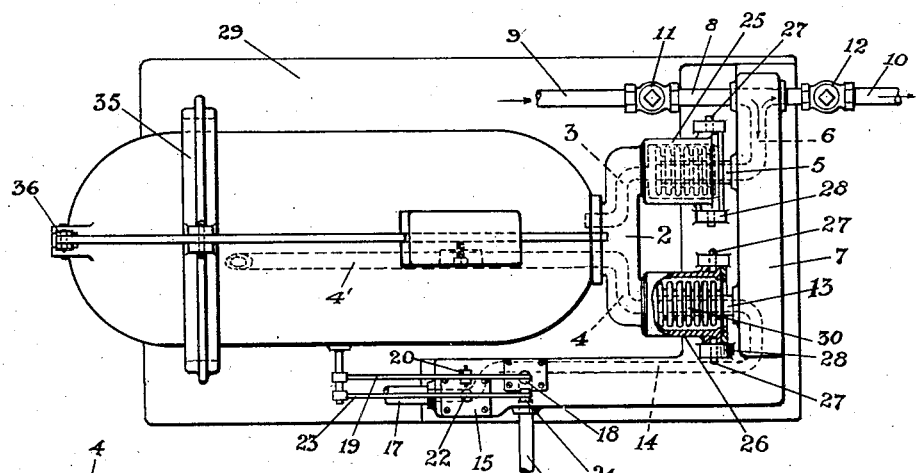
Fig. 2 is a plan view thereof.

In the form shown, 1 is a vessel constituting the main part of the trap, said vessel being mounted for movement in response to the weight of accumulated fluid therein by means to be described hereafter. In communication with said vessel are a water inlet and outlet conduit and a steam inlet and vent conduit. While these conduits may be provided in a wide variety of ways, the illustrated embodiment of the invention comprises the following construction: Connected to one end of the vessel 1 is a casting 2, providing two ducts 3 and 4. Duct 3 communicates at one end with the interior of the vessel adjacent the bottom thereof, and at the other end with a pipe 5 connected with a passage 6 in a fixed casting 7. Passage 6 communicates with a conduit 8 which is designed to receive the water of condensation from pipe-section 9 connected with one end thereof, and to deliver the water, which accumulates in the vessel 1, to the boiler through pipe-section 10 connected with the opposite end thereof. A check-valve 11 permits the flow of the water of condensation from pipe-section 9 into conduit 8, but prevents the water in conduit 8 from being forced back into pipe-section 9. A check-valve 12 permits the flow of the accumulated water in the trap into pipe-section 10, when the same is to be fed to the boiler, but is under the full pressure of the steam in the boiler to prevent the steam or water being backed into the passage 6. Duct 4 at one end communicates with a pipe 4' extending up within the vessel to a point adjacent the top thereof, and at the opposite end with a pipe 13 connected with a passage 14 in the casting 7. Passage 14 leads to a valve housing 15 wherein it branches to communicate with a steam-inlet pipe 16 and with a pipe 17 which constitutes a vent. The admission of steam to the passage 14 is controlled by a valve 18 operated by a lever 19 which is fulcrumed at 20 and connected to an operating arm 21 mounted on the exterior of the vessel 1. Communication between the passage 14 and vent-pipe 17 is controlled by a second valve 22 operated by a lever 23 fulcrumed at 24 and connected at its opposite end with the operating arm 21.

Figure 3:
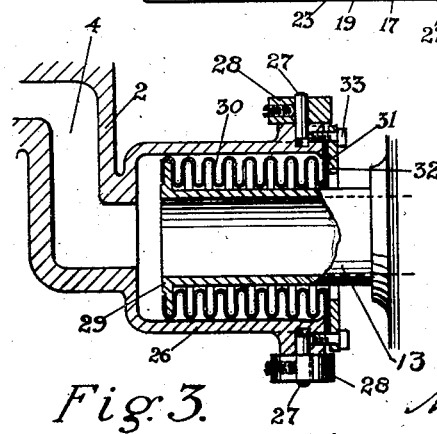
Fig. 3 is a detail of the flexible connection.

In the form shown vessel 1 is mounted for tilting movement about a transverse axis by the provision of pivot pins. While the pivots may coact with any suitable part of the trap to provide a tilting axis therefor, the preferred embodiment of the invention comprises the following construction:—Projecting from the casting 2 in alinement with the ducts 3 and 4, and desirably integral with said casting, are parallel tubular extensions 25 and 26, with which coöperate pivot pins 27 mounted in brackets 28 upon the base plate 29. To provide for the tilting movement of the vessel 1 about the axis of the pivots 27 without breaking joint between the extensions 25 and 26 on the one hand, and the pipes 5 and 13 on the other hand, flexible connections in the form of flexible walls are interposed between the respective free ends of said extensions and said pipes. In the form shown, pipes 5 and 13 project into the tubular extensions 25 and 26 in telescopic relation therewith, and the respective free ends of said extensions and pipes are connected by flexible expansible and collapsible corrugated-metal walls 30. While these flexible walls may be connected with said pipes and extensions in any suitable way, a desirable construction is shown in detail in Fig. 3, wherein the end of pipe 13 is shown as flanged at 29 and the end corrugation of the flexible wall is brazed or otherwise suitably secured thereto. The opposite end of the flexible wall is shown as spun out to provide a flange 31 which is suitably clamped against the end of extension 26, as by a collar 32 and screws 33.

In order that there shall be no unbalanced pressure within the vessel 1 owing to the apertures provided where the ducts communicate therewith or within the movable portions of the conduit or conduits communicating therewith, particularly the flexible wall or walls, the axis of the pivots 27 is preferably positioned to intersect the axes of the conduits provided by the ducts 3 and 4 and the pipes 5 and 13 and therefore the axes of the flexible walls. With the pivotal axis so positioned, steam pressure within the conduit provided for admission of steam does not adversely affect the tilting movement of the vessel. On the other hand, any slight unbalanced force arising from relative extension and contraction of the flexible wall or walls is such as tends to aid movement of the vessel to discharge position, and not oppose such movement as in prior devices.

The vessel 1 is suitably counter-weighted as by the provision of a weighted lever 34 pivoted on a looped bracket 35 and connected at one end through link 36 to the end of vessel 1 opposite its pivotal mounting.

In operation, assuming the parts to be in the position shown in Fig. 1, the water of condensation enters the vessel 1 through pipe-section 9, valve 11, conduit 8, passage 6, pipe 5, and duct 3. Valve 22 is open and valve 18 closed. Steam pressure within the pipe 10 maintains check-valve 12 closed. As the water rises within the vessel 1, the vapors therein escape through pipe 4', duct 4, pipe 13, passage 14 and vent-pipe 17. When the water that has accumulated therein is sufficient to overcome the counter-weight, said vessel tilts about the axis of the pivots 27, movement of the vessel causing operating arm 21 and levers 19 and 23 to open valve 18 and close valve 22. Thereupon steam flows from pipe 16 through passage 14, pipe 13, duct 4, and pipe 4' into the interior of the vessel 1. The pressure upon opposite sides of check-valve 12 is now balanced, and such valve opens under the weight of the water accumulated in vessel 1, the water flowing out of the vessel through duct 3, pipe 5, passage 6, valve 12 and pipe-section 10 back to the boiler. Check-valve 11 now prevents the water being forced into pipe-section 9. When the vessel has become lightened so as to no longer overcome the counter-weight, said vessel rises, closing valve 18 and opening valve 22, and restoring the parts to the condition assumed at the beginning. Thus, although the extensions 25 and 26 and the pipes 5 and 13 are rigid, the connections provided by the flexible walls 30 permit the vessel to tilt about the axis provided by the pivots 27 without the pressure on said walls adversely affecting such movement.

It will now be perceived that a trap has been provided wherein a vessel is mounted for movement under the weight of accumulated fluid therein, but without the opposition of tight packings or the binding of overheated hollow trunnions. Also, fluid-tight connections are maintained between rigid sections of the inlet and outlet conduits while offering substantially no resistance to the movement of the vessel. Furthermore, owing to the location of the pivots with respect to said inlet and outlet conduits, there is no unbalanced pressure within the vessel or movable portions of the conduits to adversely oppose movements of the vessel.

While the invention has been described as embodied in a structure for feeding the water of condensation back to the boiler, it is to be expressly understood that the invention is also of utility when embodied in other type of traps or devices employing a movable vessel, and the same is not to be restricted to use in any particular system or in connection with any particular fluid.

What I claim is:

1. A trap comprising a vessel mounted on transverse pivots to be tilted by the weight of accumulated fluid therein, and a conduit communicating with said vessel and comprising a section of flexible expansible and collapsible corrugated wall, the axis of said pivots at all times intersecting the axis of said wall.

2. A trap comprising a vessel mounted on transverse pivots to be tilted by the weight of accumulated fluid therein, and a conduit communicating with said vessel and comprising a section of flexible wall, the axis of said pivots at all times intersecting the axis of said wall.

3. A trap comprising a vessel mounted on transverse pivots to be tilted by the weight of accumulated fluid therein, and conduits communicating with said vessel and each comprising a section of flexible wall, the axis of said pivots at all times intersecting the axes of said walls.

4. A trap comprising a vessel mounted on transverse pivots to be tilted by the weight of accumulated fluid therein, and conduits communicating with said vessel and each comprising a section of corrugated-metal wall, the axis of said pivots at all times intersecting the axes of said walls.

5. A trap comprising a vessel mounted on transverse pivots to be tilted by the weight of accumulated fluid therein, and a conduit communicating with said vessel, said conduit being separate from and extending at an angle to the axis of said pivots and having a movable portion so positioned with respect to said axis that the pressure within the movable portion of said conduit is at all times substantially balanced with respect to said axis.

6. A trap comprising a vessel mounted on transverse pivots to be tilted by the weight of accumulated fluid therein, and a conduit communicating with said vessel at an angle to the axis of said pivots, said conduit comprising a section of flexible wall so positioned with respect to said axis that the pressure on said wall is substantially balanced with respect to said axis.

7. A trap comprising a vessel mounted on transverse pivots to be tilted by the weight of accumulated fluid therein, and a conduit communicating with said vessel at an angle to the axis of said pivots, said conduit comprising a section of corrugated-metal wall so positioned with respect to said axis that the pressure on said wall is substantially balanced with respect to said axis.

8. A trap comprising a vessel mounted on transverse pivots to be tilted by the weight of accumulated fluid therein, a water-inlet-and-outlet conduit communicating with said vessel, a steam-inlet-and-vent conduit communicating with said vessel, each of said conduits comprising a section of flexible wall, the axis of said pivots at all times intersecting the axes of said conduits, and valves controlled by the tilting of said vessel and controlling said vent and steam-inlet.

9. A trap comprising a vessel mounted on transverse pivots to be tilted by the weight of accumulated fluid therein, a water-inlet-and-outlet conduit communicating with said vessel, a steam-inlet-and-vent conduit communicating with said vessel, each of said conduits comprising a section of corrugated-metal wall, the axis of said pivots at all times intersecting the axes of said conduits, and valves controlled by the tilting of said vessel and controlling said vent and steam-inlet.

10. A trap comprising a vessel mounted on transverse pivots to be tilted by the weight of accumulated fluid therein, a water-inlet-and-outlet conduit communicating with said vessel, a steam-inlet-and-vent conduit communicating with said vessel, said conduits being separate from and extending at an angle to the pivot axis and having movable portions so positioned with respect to said pivot axis that the pressure within the movable portions of said conduit is substantially balanced with respect to said axis, and valves controlled by the tilting of said vessel and controlling said vent and steam-inlet.

11. A trap comprising a vessel mounted on transverse pivots to be tilted by the weight of accumulated fluid therein, a rigid duct protruding from and movable with said vessel, a pipe having a stationary rigid end, the free ends of said duct and pipe being in telescopic relation, and a flexible wall connecting the free ends of said duct and pipe.

12. A trap comprising a vessel mounted on transverse pivots to be tilted by the weight of accumulated fluid therein, a rigid duct protruding from and movable with said vessel, a pipe having a stationary rigid end extending within said duct, and a flexible wall connecting the free ends of said duct and pipe, said pivots coöperating with the protruding end of said duct to mount said vessel tiltably.

13. A trap comprising a vessel mounted on transverse pivots to be tilted by the weight of accumulated fluid therein, rigid ducts protruding from and movable with said vessel, pipes having stationary rigid ends in telescopic relation with said ducts, and a flexible wall between the free end of each duct and the free end of its corresponding pipe, said pivots coöperating with the protruding ends of said ducts to mount said vessel tiltably.

14. A trap comprising a vessel to be moved by the weight of accumulated fluid therein, and a conduit communicating with said vessel and comprising a section of flexible wall so arranged that the pressure on said wall does not adversely affect the movement of said vessel.

15. In combination, a vessel, a conduit communicating with said vessel and comprising a section of flexible wall, and means mounting said vessel for movement under the weight of the fluid therein so related to said flexible wall that the pressure thereon will not adversely affect the movement of said vessel.

16. In combination, a vessel, a conduit communicating with said vessel and comprising a section of corrugated-metal wall, and means mounting said vessel for movement under the weight of the fluid therein so related to said corrugated-metal wall that the pressure thereon will not adversely affect the movement of said vessel.

17. In combination, a vessel, a conduit communicating with said vessel and comprising a section of flexible wall, and means mounting said vessel for pivotal movement about a transverse axis under the weight of the fluid therein, said pivotal axis being so related to said flexible wall that the pressure thereon will not adversely affect the movement of said vessel.

18. In combination, a vessel, a conduit communicating with said vessel and comprising a section of flexible wall, and means mounting said vessel for pivotal movement about a transverse axis, said pivotal axis at all times intersecting the axis of said flexible wall.

19. In combination, a vessel, a conduit communicating with said vessel and comprising a section of flexible, expansible and collapsible corrugated-metal wall, and means mounting said vessel for pivotal movement about a transverse axis under the weight of the fluid therein, said wall being so arranged that the pressure thereon will not adversely affect the tilting of the vessel.

20. In combination, a vessel, means mounting said vessel for movement about a transverse axis under the weight of the fluid therein, and a conduit communicating with said vessel and comprising rigid telescoping sections and a section of flexible wall connecting said rigid sections, the axis of movement of said vessel intersecting the axis of said flexible wall.

21. In combination, a vessel, means mounting said vessel for pivotal movement, and a conduit communicating with said vessel and subjected to pressure, said conduit comprising a section of flexible wall so arranged with respect to said mounting means that the pressure on said flexible wall will not adversely affect the movement of said vessel.

22. In combination, a vessel, a conduit communicating with said vessel and comprising a section of flexible wall, said conduit adapted to be subjected to pressure, and means mounting said vessel for movement and so related to said flexible wall that the pressure thereon will not adversely affect the movement of said vessel.

In testimony whereof I have signed this specification.

WESTON M. FULTON.